United States Patent [19]

Dölitzsch et al.

[11] 3,795,928

[45] Mar. 12, 1974

[54] WASHING APPARATUS FOR VEHICLES, MORE PARTICULARLY FOR MOTOR VEHICLES

[76] Inventors: Heinz Dölitzsch, Adolfstrasse 73, Hamburg; Gerhard Skirde, Alte Schule, Trelde, both of Germany

[22] Filed: Nov. 12, 1971

[21] Appl. No.: 198,136

[52] U.S. Cl. .............................. 15/21 E, 15/DIG. 2
[51] Int. Cl. ............................................... B60s 3/06
[58] Field of Search ............. 15/DIG. 2, 21 D, 21 E, 15/53, 97

[56] References Cited
FOREIGN PATENTS OR APPLICATIONS

| | | | |
|---|---|---|---|
| 1,530,921 | 7/1969 | Germany | 15/DIG. 2 |
| 1,810,516 | 6/1970 | Germany | 15/DIG. 2 |
| 1,094,393 | 12/1967 | Great Britain | 15/DIG. 2 |

Primary Examiner—Edward L. Roberts
Attorney, Agent, or Firm—Ernest F. Marmorek

[57] ABSTRACT

A vehicle washing apparatus consisting of a portal-shaped self propelled washing bridge with a vertically adjustable horizontal washing brush and a pair of lateral vertical washing brushes whereby at least one bearing support assembly is connected to a horizontal frame member of the washing bridge and provided with a motor driven track roller rolling on a lower surface of an overhead guide rail and two pairs of tandem arranged floatingly mounted inclined guide rollers rolling on lateral portions of the guide rail. The bearing support assembly is extensibly connected to the horizontal frame member and allows a vertical adjustment of with respect to the washing bridge.

5 Claims, 6 Drawing Figures

WASHING APPARATUS FOR VEHICLES, MORE PARTICULARLY FOR MOTOR VEHICLES

The present invention relates to a washing apparatus for vehicles, more particularly for motor vehicles, comprising a portal-shaped self propelled washing bridge which can be moved, in opposite directions and parallel to a stationary vehicle, along guide members, the washing bridge having a pair of vertical frame members, a transverse horizontal frame member, horizontal and vertical water-fed washing brushes and drive means for an elevation adjustment of the horizontal washing brush which is movably mounted in vertical guide rails and for swinging the swingingly mounted vertical brushes and whereby the horizontal washing brush is arranged as a feeler member for sensing the contour of the vehicle being washed and correspondingly controlling hydraulic, pneumatic or electric drive means for varying the elevational position of the horizontal washing brush.

There are known apparatus of this type having a stationary frame with vertical washing brushes which are swingingly mounted for cleaning the front, rear and side surfaces of the vehicle. In addition to the vertical brushes there may also be provided horizontal brushes for cleaning the roof of the vehicle. A stationary roof washing brush is suitable only for vehicles having identical heights such as for example a certain type of busses. In washing apparatus of this type the various cleaning devices are arranged one behind the other and during a washing operation the vehicle is either pulled through the washing plant or may be driven by its own motive force through the plant. Plants of this type are stationary and require a considerable space. These plants are unsuitable for vehicles such as passenger automobiles since proper washing of the bonnet or of the boot outside cannot be carried out and the apparatus does not adapt itself to the most varied shapes and dimensions of passenger automobiles.

There are also known washing apparatus comprising a portal-shaped washing bridge provided at its bottom or floor end with motor driven running wheels guided on rails on the floor of the washing hall so that the washing bridge may be moved along these rails. The floor mounted guide rails for the washing bridge may also be substituted by a guide rail mounted on the ceiling of the washing hall.

It is an object of the present invention to provide a washing apparatus as defined above with novel and improved devices allowing to properly guide the washing bridge along guide members mounted on the ceiling of a washing hall or the like and moreover allowing to adapt the washing bridge to various elevational positions with respect to the guide member mounted on the ceiling of a washing hall or the like. Toward this purpose a washing apparatus for vehicles is so constructed in accordance with the present invention that at least one bearing support is connected to the horizontal frame member of the portal-shaped washing bridge, the bearing assembly provided with a motor driven track roller guided on and biased against the outer flange surface of a guide rail mounted on the ceiling of a washing hall or on a frame in a position overlying the washing bridge and having a T or I section, and two pairs of tandem arranged floatingly mounted guide rollers, one pair of guide rollers on either side of the web portion of the guide rail, each of the guide roller axes inclined at an angle of about 45° to the vertical flange of the guide rail whereby the guide rollers move along the respective adjacent web and flange surface portions of the guide rail.

The bearing support assembly comprises two L-shaped brackets mounted on a base plate attached to the horizontal frame member, each of the vertically extending legs of the L-shaped brackets provided at its free upper end with an U-shaped bearing support inclined at 45° and adapted to rotatably mount the pair of guide rollers, each of the inclined bearing supports having at its lower end a guide pin matingly engaged by and guided in a recess in the adjacent vertical bracket leg of the track roller bearing support and biased by a tension spring so that an always unvaried contact pressure of the guide rollers against the guide rail will be obtained.

To also assure an unvaried contact pressure of the motor driven track roller and for allowing to install the washing bridge in washing halls having different heights, the elevation of the base plate together with the track roller bearing support may be adjusted, according to another feature of the present invention, by means of hydraulic lifting cylinders provided at the horizontal frame member of the washing bridge. Instead of the bearing support assembly with the track and guide rollers the height of the portal-shaped washing bridge may be adjustable. Toward this end, the vertical frame members of the washing bridge may comprise hydraulic pressure cylinders. In the latter case, the vertical washing brushes are rotatably mounted in bearing supports connected either to the horizontal frame member or to the vertical frame members of the washing bridge so that the vertical washing brushes are adjusted in vertical direction simultaneously with the washing bridge.

The drawing shows several illustrative embodiments of the washing apparatus according to the present invention in which FIG. 1 is a side view of a washing bridge guided along a guide rail mounted on the ceiling of a washing hall;

Figure 1:
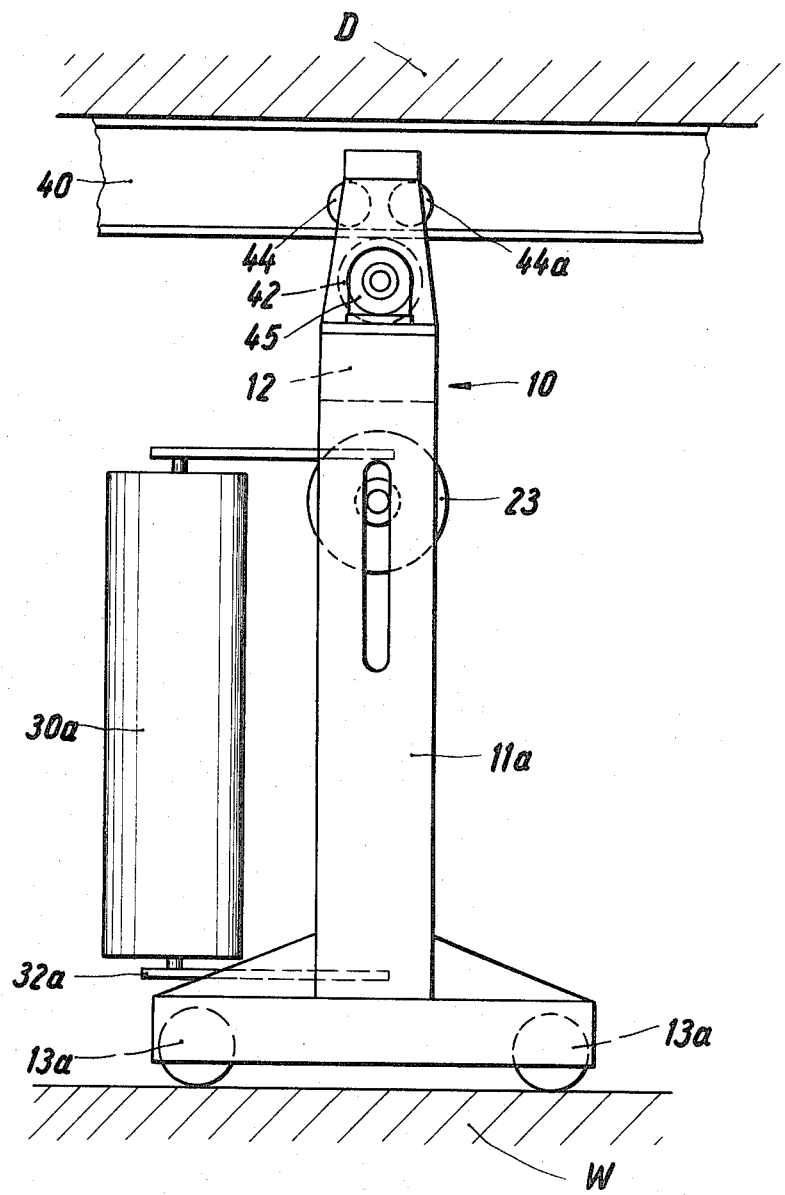

In all figures of the drawing the washing bridge has been indicated by the reference numeral 10. The washing bridge is of a portal-shape configuration and comprises two mutually spaced vertical or upright frame members 11 and 11a the upper free ends of which are connected by a horizontal transverse frame member 12. Running wheels 13, 13a are provided at the bottom end of either of the vertical frame members 11, 11a. The floor of the washing hall (in which the apparatus is supposed to be installed) is indicated by the letter W, and the ceiling by D. Also provided at the washing bridge are electricity and water supply facilities not shown in the drawing.

The vertical frame members 11, 11a are provided with guides 97 and 97a for carriages mounting the drive shaft indicated at 22 of a horizontal washing brush 23. The guiding carriages may be lifted and lowered by means of a set of cables. Preferably, the guiding carriages are in connection with each other through a drive cable which is wound up on a winding drum connected to a self-retarding gear motor 96 so that the washing brush 23 cannot be lowered independently by its own weight. The lowering and lifting of the washing brush 23 can be carried out only when the gear motor rotates accordingly. The washing brush 23 is rotated by means of a drive motor 95 associated with a feeler member 99 which detects the working pressure of the brush 23 against the surface of the vehicle. The feeler member 99 cooperates with a control device 100 which controls the vertical position of the brush 23 by means of the aforementioned motor 96.

Figure 2:
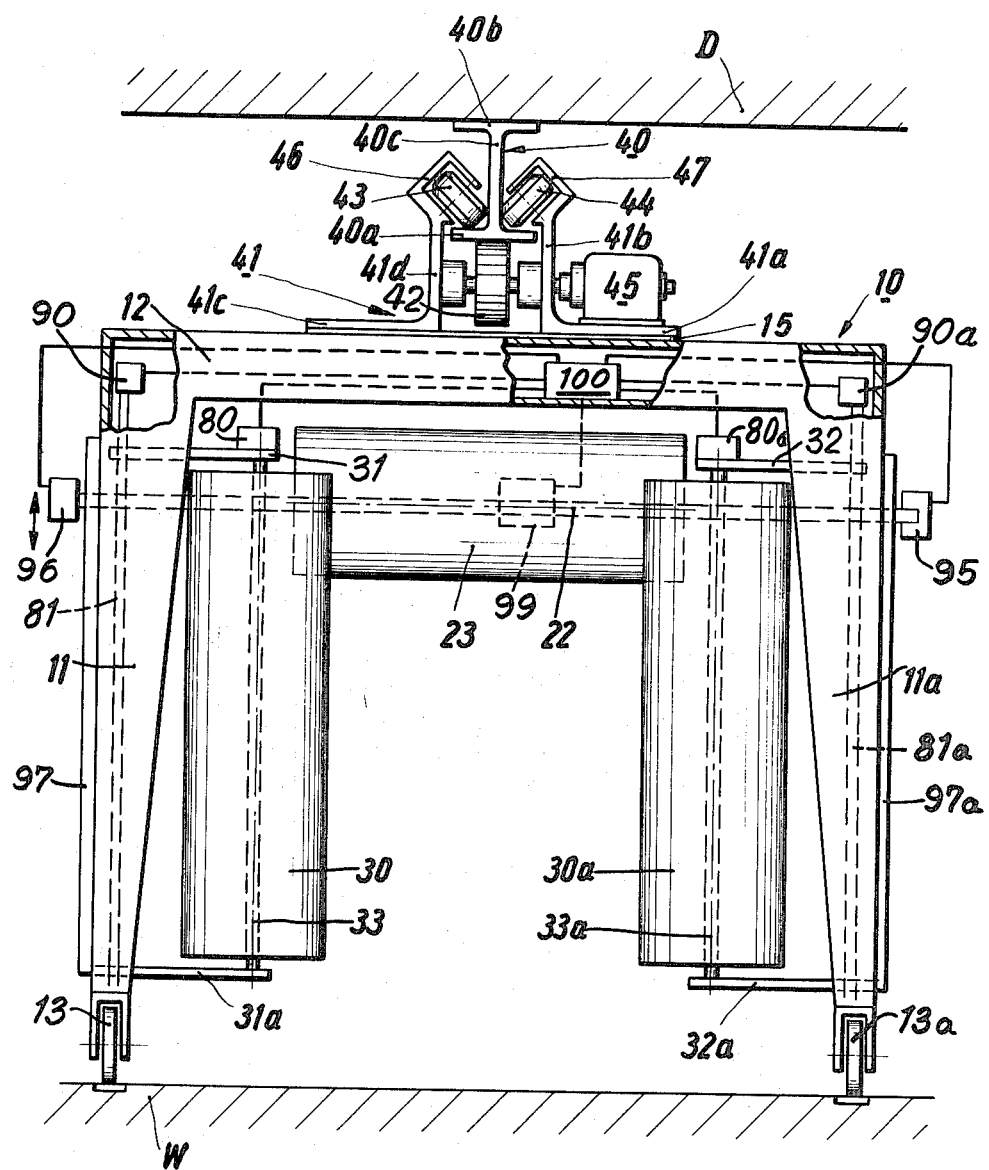
FIG. 2 is a front view of the washing bridge of FIG. 1 showing the bearing support assembly for the track and guide rollers.

The washing bridge 10 is also provided with two vertical washing brushes 30, 30a mounted at the free ends of swinging arms 31, 31a and 32, 32a respectively which are connected to the vertical frame members 11, 11a of the portal-shaped washing bridge (FIG. 2). The washing brushes 30, 30a are moved into their operative and rest positions by means of rotary upright axles 81 and 81a connected to the swinging arms 31, 31a and 32, 32a and driven by driving means 90, 90a respectively. The axes 33, 33a of the washing brushes 30, 30a are connected to corresponding drive motors 80 and 80a, respectively. The driving devices 80, 80a, 90, 90a, 95, 96 and the feeler member 99 together with the control device 100 form a single control system which can be adjusted for bringing the upright brushes into and out of their operative positions and controlling also the horizontal brush according to a predetermined program.

Figure 3:
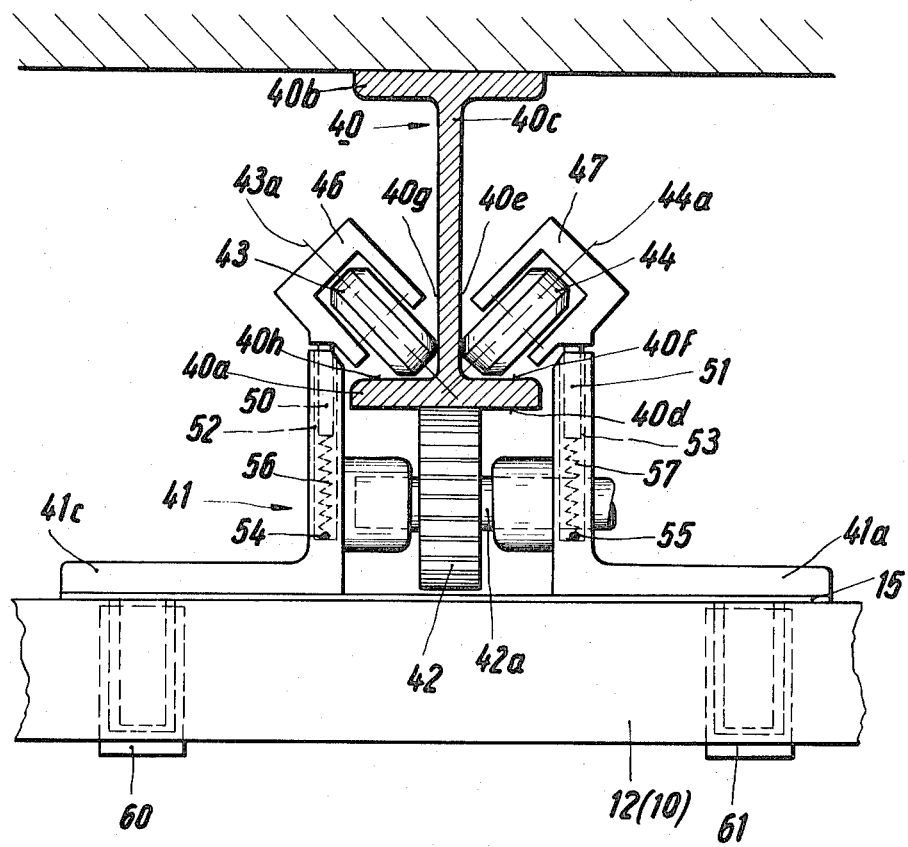
FIG. 3 is a fragmentary front view of the washing bridge of FIGS. 1 and 2 and showing lifting devices for the bearing support assembly.

According to the preferred embodiment shown in FIGS. 1 and 2 of the drawing a guide rail 40 of I section (i.e., double T section) is mounted at the ceiling D of the washing hall. The guide rail 40 may also be of T section and may be attached to a framework supported on the floor W. The flanges of the I section are designated with 40a and 40b, and the web is designated by 40c. Whereas the flange 40b serves to mount the guide rail 40 on the ceiling D of the washing hall the outer surface 40d of the flange 40a serves as contact or rolling surface for a track roller 42 journalled in a bearing support assembly 41. The mutually facing adjacent web and flange surfaces 40e and 40f as well as 40g and 40h respectively serve as contact or rolling surfaces for guide rollers 43, 44 which are likewise rotatably mounted in the bearing support assembly 41 as will be described further below (FIG. 3).

The bearing support assembly 41 for the track roller 42 consists preferably of a pair of L-shaped brackets having the legs 41a, 41b and 41c, 41d. By means of the legs 41a and 41c the L-shaped brackets are connected either directly to the horizontal frame member 12 of the washing bridge 10 when the bridge may be adjusted up and down, or to a base plate 15 which in turn is vertically adjustable and connected to the washing bridge 10. The drive shaft 42a of the track roller 42 which is preferably made of rubber is mounted in the two legs 41b, 41d of the bearing support assembly 41 and is connected to a drive motor 45 which is mounted either on the bearing support assembly 41 or on the base plate 15 for the assembly 41.

The guide rollers 43, 44 are journalled in the bearing support assembly 41. Toward this end, a pair of U-shaped bearing supports 46, 47 is mounted at the upper free end portions of the legs 41b, 41d of the bearing support assembly 41 and are inclined at an angle of about 45° to the horizontal frame member 12 of the washing bridge 10 so that the guide rollers 43, 44 which are likewise made of rubber are mounted in an inclined position in these bearing supports 46, 47 respectively and may ride on the mutually facing web and flange surfaces 40f, 40e and 40h, 40g of the guide rail 40. The overall arrangement of the guide rollers 43, 44 is such that the longitudinal center planes indicated at 43a, 44a extending through the guide rollers 43 or 44 respectively intersect each other at the junction of the flange 40a and the web 40c (FIG. 3). Each bearing support 46, 47 mounts two guide rollers in a tandem arrangement. In FIG. 1 the guide roller arranged behind the guide roller 44 is referenced 44a. Similarly, on the opposite side of the guide rail 40 there is a second guide roller (not shown) arranged behind the guide roller 43.

In order to prevent that the guide rollers 43, 44 are lifted away from their contact surfaces 40f, 40e and 40h, 40g respectively when changing the urging pressure exerted by the track roller 42 against the guide rail flange by a lifting movement of the bearing support assembly 41 or of the whole washing bridge 10 the bearing supports 46, 47 for the guide rollers 43, 44 are biased by tension springs. Each of the bearing supports 46, 47 has at its bottom end a guide pin or guide plate 50, 51 which is guided in a correspondingly arranged recess 52, 53 in the leg 41b, 41d of the bearing support assembly 41. The lower free ends of the guide pins or plates 50, 51 are connected to a tension spring 56, 57 respectively attached at 54 or 55 to the bottom of the corresponding recess. These tension springs serve to urge the guide rollers 43, 44 against their respective contact surfaces also when the elevational position of the bearing support assembly 41 or the washing bridge 10 respectively is changed.

Figure 4:
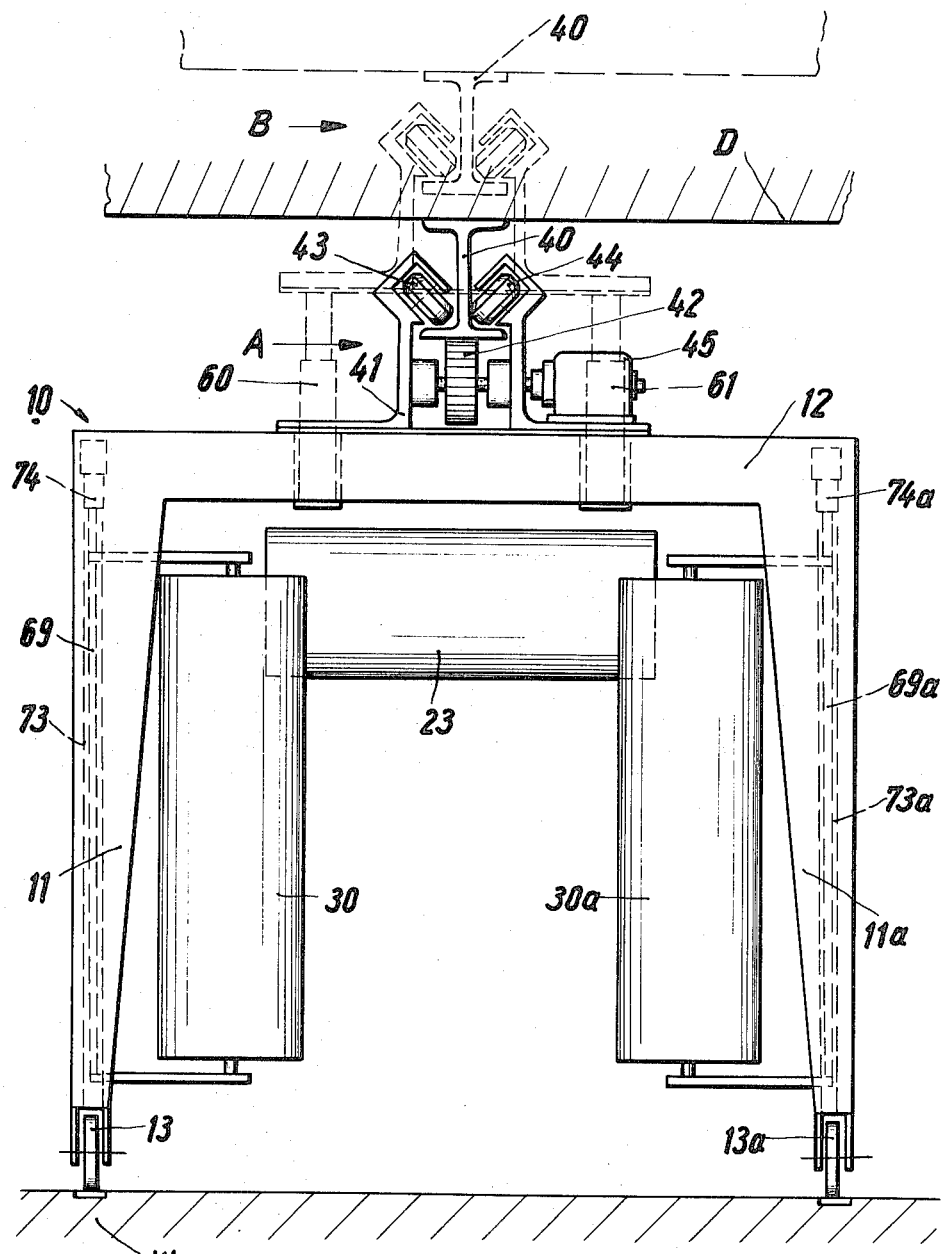
FIG. 4 is a front view of the washing bridge with the bearing support assembly in an elevated position.

The base plate 15 with the bearing support assembly 41 for the track roller 42 and the guide rollers 43, 44 are connected to conventional hydraulic lifting cylinders 60, 61 arranged in the horizontal frame member 12 and controlled by control devices not shown in the drawing in a manner so as to maintain always substantially one and the same roller contact pressure level and to allow an installation of the washing bridge in washing halls having different heights, without requiring any modifications to the basic design of the washing bridge (FIG. 3). The extended position of the lifting cylinders 60, 61 is shown in FIG. 4. In this figure, the initial position of the bearing support assembly 41 is indicated with A. The extended position of the bearing support assembly 41 is indicated with B.

Figure 5:
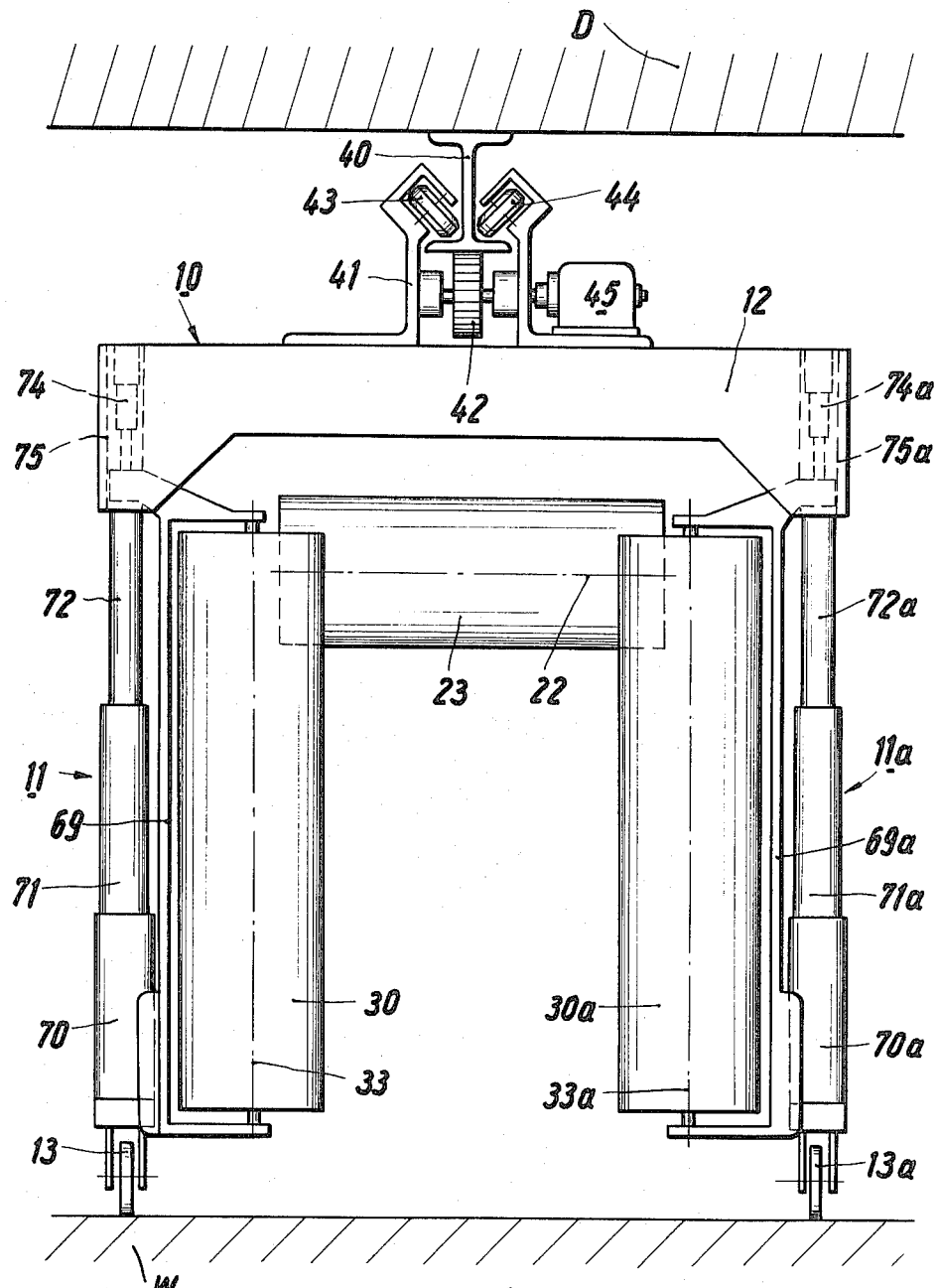
FIG. 5 shows a front view of another embodiment of a washing bridge having lateral frame members arranged in the form of lifting cylinders.
Figure 6:
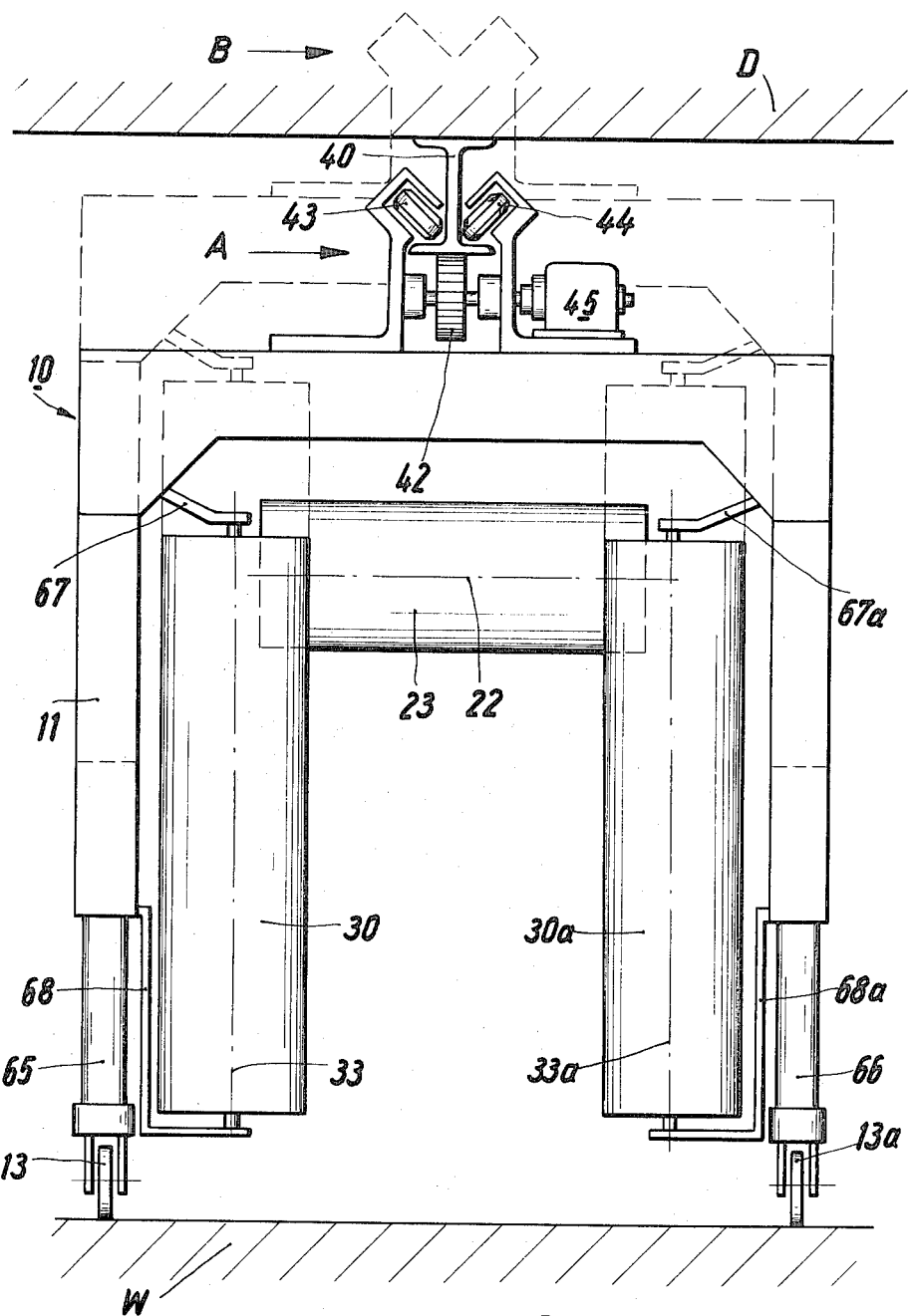
FIG. 6 is a front view of a somewhat modified embodiment of the washing bridge in an elevated position.

According to another embodiment of the invention shown in FIG. 5, the vertical frame members 11, 11a of the washing bridge 10 are subdivided into several telescopically adjustable sections having the form of hydraulic pressure cylinders which allow an elevation adjustment of the washing bridge. It is, however, likewise possible to arrange only the lowermost section of the vertical frame members 11, 11a in the form of a lifting cylinder as shown in FIG. 6. The lifting cylinders are indicated at 65, 66. In this embodiment, the axes 33, 33a of the two vertical washing brushes 30, 30a are mounted in bearing arms 67, 68 and 67a, 68a of which the upper bearing arms 67, 67a are connected to the washing bridge 10 in the region of the upper horizontal frame member 12 whereas the lower bearing arms 68, 68a are connected to the stationary vertical frame members 11, 11a so that the washing brushes 30, 30a may be adjusted vertically together with the washing bridge 10, if required. In the embodiment shown in FIG. 5 the bearing supports 69, 69a for the vertical washing brushes 30, 30a are similarly mounted on the washing bridge 10. If the vertical washing brushes 30, 30a are not intended to be vertically adjusted together with the washing bridge 10 then the bearing supports 69, 69a for the washing brushes 30, 30a will be mounted only at the lower stationary frame member sections 70, 70a on which the running wheels 13, 13a are likewise mounted whereas the frame member sections 71, 71a and 72, 72a are arranged in the form of extensible lifting cylinders (FIG.5).

The guide and drive means according to the present invention for the ceiling guided washing apparatus have the advantage that the washing bridge may be constructed with smaller dimensions thus making the manufacture more economical. Even with greater washing hall heights no additional extensions are required for stabilizing the washing bridge. By employing a driven track roller and four guide rollers the axes of which are inclined at about 45° with respect to a horizontal plane a stable equilibrium of the overall apparatus is achieved. By the expedient that the washing bridge is virtually secured at the guide rail a high safety factor and a safeguard against tumbling over of the washing bridge are achieved even if the running wheels are mounted on the vertical frame members of the washing bridge without these frame members having any outrigger type wheel mountings. Furthermore it will be no longer necessary to arrange several running wheels on every upright. One running wheel on each upright is sufficient. Further advantages are a reduced wear of the drive and guide members of the washing bridge and a reduced noise level when moving the washing bridge.

Another advantageous feature is the possibility of elevation adjustment of the drive means of the washing bridge or the vertical adjustability of the washing bridge itself. This feature allows a basic design of a washing bridge that may be installed in washing halls having different heights, without requiring any additional parts. Due to the elevation adjustment feature the washing bridge may be installed readily within low halls as well as within high halls. An automatic compensation for height differences is effected by the lifting cylinders for the bearing support assembly with the track roller and the guide rollers so that any unevenness of the floor is readily compensated for without reducing the urging or biasing pressure of the track roller.

The embodiments of the invention in which an exclusive property or privilege is claimed are defined as follows:

1. A washing apparatus for vehicles, including a portal-shaped self propelled washing bridge movable in opposite directions parallel to a standing vehicle, said bridge having a pair of upright frame members and a horizontal top frame member, horizontal and upright water-fed washing brushes and adjustment means for adjusting the working position of said brushes relative to the vehicle,
comprising, in combination,
suspension means including an a guiding rail mounted above said bridge, said rail defining an upright stem portion and a horizontal lower flange portion,
a bearing support assembly including at least one driving roller abutting against the bottom surface of said flange portion, and
at least two idling guide rollers arranged at opposite sides of said stem portion and each having a plane of rotation intersecting the angle between the adjacent stem and flange portions so that marginal parts of the rolling surface of each roller abut both against the stem portion and the flange top surface portion,
and lifting means mounted between said bearing support assembly and said horizontal top frame member to adjust the vertical position of said washing bridge.

2. A washing apparatus as defined in claim 1, characterized in that said bearing support assembly comprises two L-shaped brackets mounted on a base plate attached to said horizontal frame member, each of the vertically extending legs of said L-shaped brackets provided at the free upper leg end with a U-shaped bearing support inclined at an angle of 45° to said leg and adapted to rotatably mount said pair of guide rollers, each of said inclined bearing supports having at its lower end a guide pin matingly engaged by and guided in a recess in the adjacent vertical bracket leg of said track roller bearing support and biased by a tension spring.

3. A washing bridge as defined in claim 1, characterized in that said track roller and said guide rollers are made of rubber and are each provided with a profiled contact surface.

4. A washing apparatus for vehicles, including a portal-shaped self propelled washing bridge movable in opposite directions parallel to a standing vehicle, said bridge having a pair of upright frame members and a horizontal top frame member, first and second waterfed washing brushes rotatable about upright, and substantially horizontal, axes respectively, and adjustment means operable for adjusting the working position of said brushes relative to the vehicle,
comprising, in combination,
suspension means including a guiding rail mounted above said bridge, said rail defining an upright stem portion and a horizontal lower flange portion,
a bearing support assembly including at least one driving roller abutting against the bottom surface of said flange portion,
at least two idling guide rollers arranged at opposite sides of said stem portion and each having a plane of rotation intersecting the angle between the adjacent stem and flange portions so that marginal parts of the rolling surface of each roller abut both against the stem portion and the flange top surface portion, and
lifting means mounted in said upright frame members to adjust the vertical position of said washing bridge.

5. A washing apparatus as defined in claim 4, characterized in that said first washing brushes are rotatably mounted in bearing supports connected to at least one of said frame members of said washing bridge.

* * * * *